(12) United States Patent
Hebrink et al.

(10) Patent No.: US 7,744,987 B2
(45) Date of Patent: *Jun. 29, 2010

(54) OPTICAL POLARIZING FILMS

(75) Inventors: Timothy J. Hebrink, Oakdale, MN (US); Laurence R. Gilbert, Marine on St. Croix, MN (US); James M. Jonza, Woodbury, MN (US); Andrew T. Ruff, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/837,627

(22) Filed: Aug. 13, 2007

(65) Prior Publication Data

US 2008/0003419 A1 Jan. 3, 2008

Related U.S. Application Data

(60) Division of application No. 11/424,711, filed on Jun. 16, 2006, now Pat. No. 7,256,936, which is a continuation of application No. 10/335,460, filed on Dec. 31, 2002, now Pat. No. 7,064,897.

(51) Int. Cl.
*B32B 7/00* (2006.01)

(52) U.S. Cl. .................. 428/220; 428/29; 359/487; 359/500; 359/584

(58) Field of Classification Search .............. 428/220, 428/29; 359/487, 500, 584; 283/91
See application file for complete search history.

(56) References Cited

U.S. PATENT DOCUMENTS

| | | | |
|---|---|---|---|
| 3,610,729 A | 10/1971 | Rogers | |
| 3,858,977 A | 1/1975 | Baird et al. | |
| 4,215,374 A * | 7/1980 | Mizuno | 382/238 |
| 4,705,356 A | 11/1987 | Berning et al. | |
| 4,876,137 A * | 10/1989 | Utsumi | 428/141 |
| RE33,729 E | 10/1991 | Perilloux | |
| 5,103,337 A | 4/1992 | Schrenk et al. | |
| 5,360,659 A | 11/1994 | Arends et al. | |
| 5,486,949 A | 1/1996 | Schrenk et al. | |
| 5,808,798 A | 9/1998 | Weber et al. | |
| 5,828,488 A | 10/1998 | Ouderkirk et al. | |
| 5,882,774 A | 3/1999 | Jonza et al. | |
| 6,045,894 A | 4/2000 | Jonza et al. | |
| 6,114,018 A | 9/2000 | Phillips et al. | |
| 6,143,398 A | 11/2000 | Tsou et al. | |
| 6,157,490 A | 12/2000 | Wheatley et al. | |
| 6,368,699 B1 | 4/2002 | Gilbert et al. | |
| 6,451,414 B1 | 9/2002 | Wheatley et al. | |
| 6,498,683 B2 | 12/2002 | Condo et al. | |
| 6,531,230 B1 * | 3/2003 | Weber et al. | 428/480 |
| 6,952,312 B2 | 10/2005 | Weber et al. | |
| 7,064,897 B2 | 6/2006 | Hebrink et al. | |
| 7,094,461 B2 | 8/2006 | Ruff et al. | |
| 7,256,936 B2 | 8/2007 | Hebrink et al. | |
| 2003/0224164 A1 | 12/2003 | Argoitia et al. | |
| 2004/0101676 A1 | 5/2004 | Phillips et al. | |

FOREIGN PATENT DOCUMENTS

| | | |
|---|---|---|
| EP | 0 298 604 | 1/1989 |
| WO | WO 97/01778 | 1/1997 |
| WO | WO 99/36258 | 7/1999 |
| WO | WO 99/36804 | 7/1999 |

OTHER PUBLICATIONS

Weber et al., "Giant Birefringent Optics in Muitilayer Polymer Mirrors", Science, vol. 287, Mar. 31, 2000, pp. 2451-2456.
EP 08 01 1860—Office Action dated Jul. 8, 2008, 4 pages.
EP 08 01 1860—European Search Report dated Sep. 12, 2008, 6 pages.
2004, WO 2004/061491A3—International Search Report, 7 pages., Sep. 22, 2008.

\* cited by examiner

*Primary Examiner*—David R Sample
*Assistant Examiner*—Lawrence D Ferguson
(74) *Attorney, Agent, or Firm*—Melissa E. Buss

(57) ABSTRACT

Multilayer films are provided that exhibit a colored appearance when viewed at an oblique angle as a result of one or more reflection bands in the visible region of the spectrum. The films however provide no substantial reflection bands in either the visible or near infrared regions for light normally incident on the film. The films can be made to shift from clear at normal incidence to an arbitrary designed color at an oblique angle without necessarily becoming cyan.

20 Claims, 5 Drawing Sheets

OPTICAL POLARIZING FILMS

CROSS REFERENCE TO RELATED APPLICATIONS

This is a divisional of U.S. application Ser. No. 11/424,711, filed Jun. 16, 2006, and now issued as U.S. Pat. No. 7,256,936 (Hebrink et al.), which is a continuation of U.S. application Ser. No. 10/335,460, filed Dec. 31, 2002, and now issued as U.S. Pat. No. 7,064,897 (Hebrink et al.).

FIELD OF THE INVENTION

The present invention relates to optical films. More particularly, the present invention relates to optical films whose apparent color changes as a function of viewing geometry.

BACKGROUND

Optical films that exhibit a visible color shift as a function of viewing geometry are known. See, e.g., PCT Publication WO 99/36258 (Weber et al.) entitled "Color Shifting Film". See also U.S. Pat. No. 6,045,894 (Jonza et al.) entitled "Clear to Colored Security Film". These references disclose many different films, each of which exhibits a shift in apparent color as the observation or incidence angle θ (measured from the surface normal) changes. Filters that comprise a glass or other rigid substrate having a stack of inorganic isotropic materials deposited thereon can also exhibit color shifts.

A common feature of these films is the presence of one or more reflection bands for normally incident light (θ=0), which band(s) then shift to shorter wavelengths as θ increases. The physics of this so-called "blue shift" of the reflection band can be explained in connection with FIG. 1, where a portion of a multilayer film 10 is shown greatly enlarged. A light ray 12 is incident from medium 1 (with isotropic refractive index $n_1$, for simplicity) at an angle $θ_1$. Part of the light ray reflects at an upper interface 14 between medium 1 and medium 2, and another part reflects at a lower interface 16 after traversing the layer of medium 2, whose physical thickness is d. Medium 2 is also assumed to have an isotropic refractive index, $n_2$, for simplicity. The two reflected rays 18, 20 eventually constructively or destructively interfere depending on the relative phases of the rays. The relative phase in turn is a function of the optical path difference (OPD) between the rays, given by:

$$OPD = 2 \cdot n_2 \cdot d \cdot \cos(θ_2) \quad (EQ. 1)$$

This quantity decreases with increasing incidence angle, corresponding to a shift to shorter wavelengths. Although the analysis is more complicated, multilayer optical films that have at least some optical layers that are birefringent rather than isotropic also experience a blue shift with increasing angle.

As the band(s) shift to shorter wavelengths, they also each split into two distinct bands: one for s-polarized light, the other for p-polarized light, where s-polarized light refers to linearly polarized light whose electric field vector oscillates perpendicular to the plane of incidence, and p-polarized light refers to linearly polarized light whose electric field vector oscillates parallel to the plane of incidence. The shift to shorter wavelengths can also be accompanied by a shift in the spectral width and shape of the reflection band, and changes in the out-of-band and in-band reflectivity. The amount of blue-shift one can attain is limited, and is a function of the medium in which the film is immersed, and the details of the film construction.

The observed color change of these known films is a manifestation of the shift of the reflection band(s) to shorter wavelengths. Since the human-visible region corresponds to a segment of the electromagnetic spectrum extending from about 400 to 700 nm, a film that is clear (i.e., substantially colorless) at normal incidence can become colored at oblique angles only by the shifting of a reflection band whose position at normal incidence is somewhere in the near infrared region, i.e., at or above about 700 nm. As this band begins to move into the visible region with increasing observation angle, it begins to block long visible wavelengths in the red, thus giving rise to a cyan appearance in transmission. This is shown schematically in FIG. 2, where a reflection band 30a for normally incident light is located initially in the near infrared region of the spectrum, and then as the angle of observation increases it transforms into band 30b at shorter wavelengths, and with increasing observation angle transforms into band 30c at still shorter wavelengths. (In FIG. 2, spectral ringing and separation into distinct s- and p-polarization reflection bands are ignored for ease of explanation.)

The spectral position of the reflection band at normal incidence is set by the optical thickness of the optical repeat units in the film. The optical thickness of a layer refers to its physical thickness multiplied by the relevant refractive index of light. Optical repeat unit refers to a stack of at least two individual layers that repeats across the thickness of a multilayer optical film, though all repeating layers need not have the same thickness. As an example, known clear-to-colored films reflect normally incident light from approximately 720 to 900 nanometers by utilizing optical repeat units whose optical thicknesses range from 360 to 450 nanometers (half the wavelength of the light desired to be reflected).

It would be advantageous to have at the optical designer's disposal films that could exhibit human visible color shifts other than those caused by a simple blue shift of existing reflection bands. Further, it would be advantageous to have available a film that could transition from clear at normal viewing to any desired color at an oblique angle.

BRIEF SUMMARY

The present application discloses films whose apparent color change with angle does not require the presence of a reflection band for normally incident light that then simply shifts to shorter wavelengths with increasing incidence angle.

In one aspect, the present specification discloses an optical film having a plurality of layers effective to provide a reflection band covering a portion of the visible spectrum at an oblique angle such that the optical film appears colored at such oblique angle. However, the plurality of layers provide substantially no reflection bands for normally incident light.

In another aspect, the specification discloses an optical film having layers that form a plurality of optical repeat units. At least some of the optical repeat units have optical thicknesses equal to half of a wavelength of visible light, yet the optical film has a clear appearance at normal incidence.

In still another aspect, the specification discloses optical films whose transmitted appearance changes from substantially clear to a first color over an angular range of observation angles. At least some of these optical films, however, do not appear cyan over such angular range.

These and other aspects of disclosed embodiments will be apparent from the detailed description below. In no event, however, should the above summaries be construed as limitations on claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION OF THE ILLUSTRATIVE EMBODIMENTS

Figure 1:
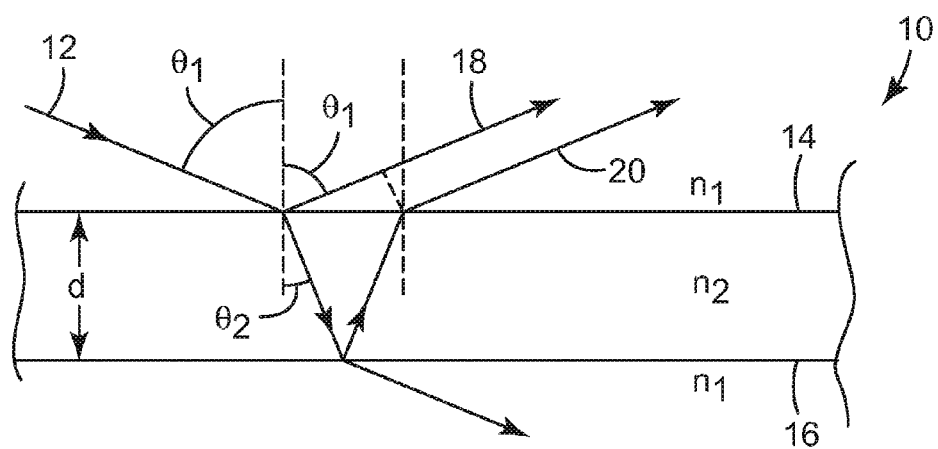
FIG. 1 is a cross-sectional view of a portion of a multilayer optical film.
Figure 2:
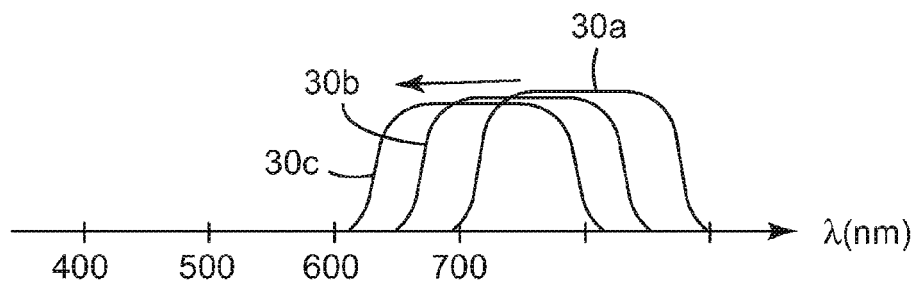
FIG. 2 is a schematic representation depicting the blue shift of a reflection band of a PRIOR ART optical film.
Figure 3:
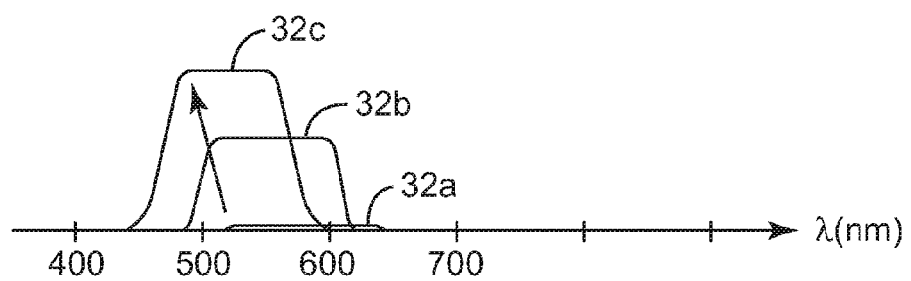
FIG. 3 is a schematic representation depicting the emergence of a reflection band in a portion of the visible region according to the present description.

To highlight a difference between previously known color shifting films and color shifting films as described herein, FIG. 3 provides a schematic representation of a reflection band for a film such as described herein. For normally and near-normally incident light, a curve 32a is provided merely to show that there is essentially no reflection band at all. As explained below, a slight in-plane mismatch of refractive indices between individual layers may give rise to a barely perceptible reflection band, but the reflectivity of such band is generally less than 20%, more typically less than 10% or 5%. (Reflectivity values given herein assume illumination with unpolarized light unless otherwise noted. The reflectivity of a reflection band is understood herein to be the maximum reflectivity of such band exclusive of any outer surface reflections of the film.) As the observation angle increases, the reflection band appears in the visible region and increases in strength as shown by curve 32b. The reflection band increases still further with increasing observation angle as shown by curve 32c. The peak reflectivity of the reflection band thus increases substantially monotonically with increasing θ, even though slight decreases in peak reflectivity of a few percent may in some circumstances occur with increasing θ at low reflectivity values if the in-plane refractive index mismatch is significant. Although a blue shift can be seen in the sequence of FIG. 3 (as was the case in the sequence of FIG. 2), FIG. 3 is most clearly distinguished by the fact that the reflection band essentially emerges from nowhere, rather than simply shifting over to the left. By judicious selection of the layer thicknesses in the optical film, one or more reflection bands can be made to appear anywhere in the visible spectrum at a selected oblique angle in a manner like that shown in FIG. 3, thus allowing the film to shift to any desired transmitted color at a selected oblique angle. Clear-to-green, clear-to-yellow, clear-to-magenta, clear-to-red, and clear-to-blue are examples of color shifts that are possible. A film can be considered clear if, having CIE color coordinates a* and b*, each are no greater than 5, or, more stringently, if the square root of $a^{*2}+b^{*2}$ is no greater than 5. Note that although a great many embodiments exist where the film does not appear cyan over the useable range of entrance angles, in some embodiments the film may well appear cyan at some entrance angles, if it is so designed. If absorbing agents are added to change the baseline on-axis appearance from clear to a particular color, still further transitions are possible such as yellow-to-red or blue-to-green.

The reflection band of FIG. 3 is associated with p-polarized light, not s-polarized light. The film is therefore a polarizing film at oblique angles. S-polarized light passes through the film without substantial reflection (except for possible outer surface reflections, which are not considered since they are substantially wavelength insensitive). Because of this, the reflection band of FIG. 3 can achieve a maximum reflectivity of 50% for unpolarized light, and the color saturation of the film (when illuminated with ordinary unpolarized light and viewed in transmission) will not be as great compared to a film that can filter both polarizations. Stated differently, the apparent color saturation can be greatly enhanced if the film is illuminated with only p-polarized light, or if it is observed through an analyzer that transmits only p-polarized light. Conversely, the colored appearance of the film can be essentially eliminated even at highly oblique angles if the film is illuminated with only s-polarized light, or if it is observed through an analyzer that transmits only s-polarized light. Significantly, the appearance of the film (whether colored or not, depending on the illumination and viewing conditions) is insensitive to rotations of the film about an axis perpendicular to the plane of the film, and to rotations of the observer about the film in such a way that the observation angle θ is maintained constant.

Figure 4:
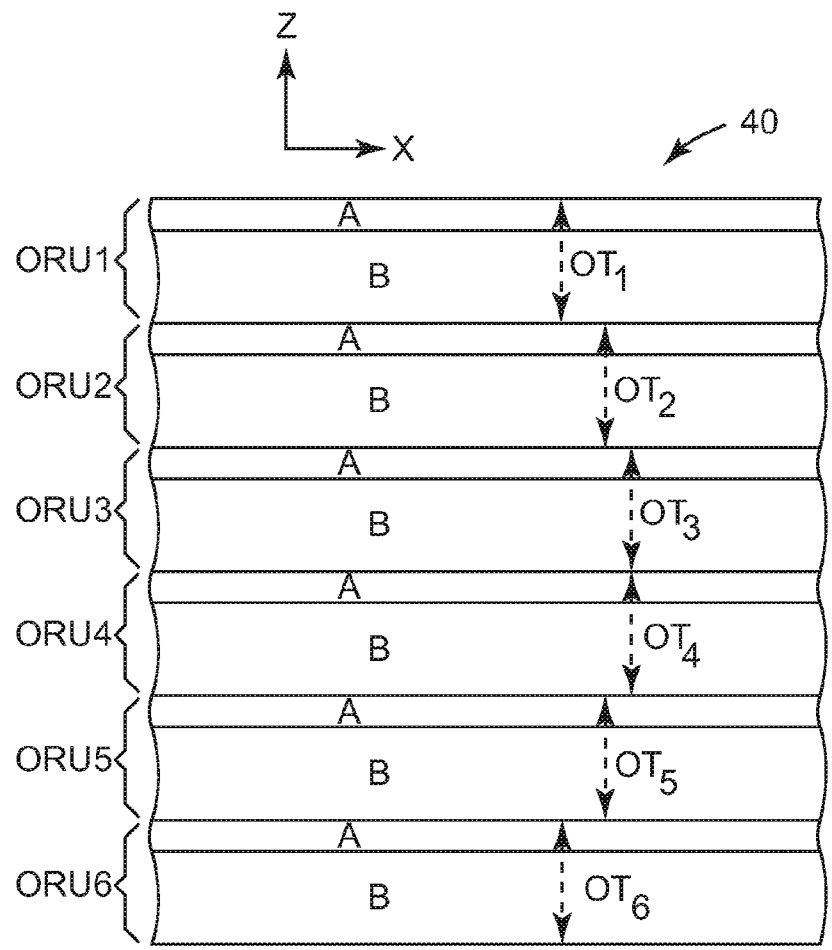
FIG. 4 is a cross-sectional view of a portion of a multilayer film as described herein.

The optical properties just described can be achieved with a multilayer interference film construction with appropriate selection of layer thicknesses and refractive indices. In a simple quarter-wave stack construction, the film comprises alternating layers of a first and second light transmissible material A, B, which layers have optical thicknesses equal to one-fourth of the visible wavelength to be reflected. A pair of adjacent A,B layers then form an optical repeat unit whose optical thickness is ½λ. A variation of this is where the optical thicknesses of the layers are not equal, or in other words the f-ratio is different than 0.50. This more general situation is shown in FIG. 4. There, an optical film 40 is provided with alternating layers A and B that form six optical repeat units ORU1, ORU2, . . . ORU6. These have corresponding optical thicknesses OT1, OT2, . . . OT6 which individually are the sum of the optical thicknesses of the applicable A layer and the adjacent B layer. Although only six optical repeat units are shown, typical films can include tens, hundreds, or thousands of individual layers. The optical repeat unit thicknesses can all be equal, in which case a relatively narrow reflection band is produced, or they can be different such as is the case with a linear gradient in layer thickness along the thickness axis of the film, producing a wider reflection band. Other layer thickness gradients can also be incorporated, such as described in U.S. Pat. No. 6,157,490 (Wheatley et al.), "Optical Film With Sharpened Bandedge".

Film 40 is shown in the context of a local x-y-z right-handed Cartesian coordinate system, where the film extends parallel to the x-y plane, and the z-axis is perpendicular to the film, corresponding to a thickness axis. The refractive indices of the individual A layers are denoted:

$n_{1x}, n_{1y}, n_{1z}$ for polarized light whose electric field vector oscillates along the x-, y-, and z-axes respectively. In like fashion, the refractive indices of the individual B layers are denoted:

$$n_{2x}, n_{2y}, n_{2z}.$$

Although strictly speaking the refractive index of most light transmissive materials is also wavelength dependent, such dependence is typically very small, particularly within the visible region, and will be ignored here. In order to achieve the optical properties discussed above, at least one of the A and B layers within each optical repeat unit is birefringent, such that there is a substantial match of refractive indices of adjacent layers along the in-plane axes, and a substantial mismatch of refractive indices along the thickness axis. If we denote the magnitude of $n_2-n_1$ along a particular axis as $\Delta n$, this set of conditions can be expressed as:

$$\Delta n_x \approx 0$$

$$\Delta n_y \approx 0$$

$$\Delta n_z \approx \text{large}$$

The resulting film is referred to as an "off-axis polarizer" or a "p-polarizer". See generally U.S. Pat. No. 5,882,774 (Jonza et al.), "Optical Film". In the relationships shown above, zero for $\Delta n_{x\ and\ for\ \Delta n_y}$ means the difference is sufficiently small to produce a negligible amount of on-axis ($\theta=0$) reflectivity for either polarization, e.g. less than about 20%, or 10%, or even 5%. This will depend on the total number of optical repeat units employed in the film, with a larger number of optical layers or optical repeat units generally requiring a smaller absolute value of the in-plane index difference to maintain a low reflectivity, and also on the thickness distribution (or "layer density"—the number of layers per range of optical thickness) of the optical repeat units. For a film having a total number of optical layers of a few hundred but less than one thousand, a refractive index difference of up to about 0.02 is typically acceptable, but a difference of 0.01 or less is preferred. "Large" for $\Delta n_z$ means large enough to produce a desired substantial amount of off-axis reflectivity, preferably at least 50% and more desirably at least 80% reflectivity for p-polarized light. These levels are achieved at oblique angles $\theta$ (measured in an air medium) of typically 50 to 80 degrees, preferably about 60 degrees. A preferred value for $\Delta n_z$ is about 0.1 or greater. The greater the value of $\Delta n_z$, the greater the reflectivity each optical repeat unit in the optical film for p-polarized light at a given oblique angle, and the greater the reflectivity of the film for a fixed number of optical repeat units, or the fewer optical repeat units required in the film for a desired reflectivity level. Reference is made to commonly assigned U.S. Application Publication 2004/0126549 (Ruff et al.), filed Dec. 31, 2002.

A multilayer film with these refractive index relationships exhibits essentially no reflection bands for normally incident light. This is because the electric field vector of such light oscillates only along the in-plane axes, thereby sampling only the in-plane refractive indices. Since those indices are substantially matched from layer-to-layer, the light beam behaves as though traveling through a monolithic material with no internal interfaces. It is only when the light propagates at a substantial angle to the z-axis, and then only where the electric field vector has a component along the z-axis (p-polarized light), that a substantial refractive index difference is experienced by the light at the individual layer interfaces, thus giving rise to reflection by constructive interference.

In addition to the refractive index relationships discussed above, however, the optical repeat units should have optical thicknesses that produce at an oblique angle a reflectivity over the human visible spectrum that is non-uniform, so that the film exhibits a colored appearance in transmitted light at such angle. The optical thicknesses of the optical repeat units can be chosen to all be equal such that a single, relatively narrow reflection band emerges in a desired portion of the visible spectrum with increasing incidence angle. Alternatively, multiple packets of optical repeat units can be used, where each packet has optical repeat units of a uniform optical thickness, but such optical thickness being different for the different packets so that distinct narrow reflection bands emerge in a desired part of the visible spectrum. Alternatively or additionally, thickness gradients can be employed to produce broadened reflection bands over portions of the visible spectrum. Multiple reflection bands can be separated by a sufficient degree to define a spectral region of high transmission (a transmission band) therebetween over a desired wavelength band such as blue, green, or red. Appropriate selection of the thicknesses of the optical repeat units therefore give the designer wide latitude to achieve nearly any desired color appearance at the oblique observation angle, not only cyan, even for a film that is substantially clear at normal incidence.

The reflectivity of a given optical repeat unit exhibits a maximum at a wavelength $\lambda$ equal to two times the optical thickness of the optical repeat unit, at normal incidence. For purposes of the present application, the optical thickness of an optical repeat unit is considered to be a constant, and equal to the sum of the optical thicknesses of the optical repeat unit's constituent optical layers for normally incident light. At least some (and preferably substantially all) of the optical repeat units in the subject films reflect visible light over a range of nonzero angles of incidence, i.e., over a range of oblique angles of incidence. Therefore, although the reflection band at large incidence angles is blue-shifted to some extent relative to the reflection band at small incidence angles, most optical films described herein will nevertheless have at least some optical repeat units whose (normal incidence) optical thickness is equal to half of a wavelength of visible light, or half of a wavelength between about 400 and 700 nm, or from about 200 to 350 nm, while also having a normal angle transmitted appearance that is substantially clear and/or having substantially no reflection bands at normal incidence, whether in the visible or near infrared regions.

As discussed above, each optical repeat unit can consist essentially of just two light transmissible optical layers. The reader will appreciate however that other known optical repeat unit designs can also be used in accordance with the above teachings. For example, four layer designs using three different materials as described in U.S. Pat. No. 5,103,337 (Schrenk et al.), "Infrared Reflective Optical Interference Film", and six layer designs using two materials as described in U.S. Pat. No. 5,360,659 (Arends et al.), "Two Component Infrared Reflecting Film", can also be used. In most instances, however, a simple two-component quarter-wave (0.50 f-ratio) design is preferred since it provides high reflectivity for the lowest order reflection and since higher order reflections are generally of no concern.

A variety of light transmissible materials can be used for the optical layers making up the optical repeat units of the subject films. Preferably, however, the materials are thermoplastic polymers that can be co-extruded from a multilayer die and subsequently cast and oriented in sequential or simultaneous stretching operations. Optically thick skin layers can be added for protection and ease of handling, which layers can become protective boundary layers between packets of optical layers within the finished film if one or more layer multipliers is used between the feedblock and the die.

In one approach that has been found advantageous, one light transmissible polymeric material (arbitrarily designated A) remains isotropic throughout the manufacturing process, and another (arbitrarily designated B) becomes birefringent during a stretching procedure in the manufacturing process. The stretching is carried out along both x- and y-axes so that the in-plane refractive indices of the birefringent material end up being about equal to each other, and equal to the refractive index of the isotropic material. The out-of-plane refractive index of the birefringent material then differs substantially from the refractive index of the isotropic material. In a particularly preferred version of this approach, material A has a relatively high (isotropic) refractive index and material B has a somewhat lower isotropic refractive index in the cast film before orientation. During orientation the refractive indices of the B material increase along the two orthogonal stretch directions to match the index of the A material, and the z-axis refractive index of the B material diminishes to widen the gap between it and the index of the A material. Meanwhile, with appropriate materials selection and careful control of the stretch conditions such as film temperature, stretch rate, and stretch ratio, the refractive index of the A material remains constant and isotropic during orientation. Material A has a high refractive index to match the in-plane refractive indices of the oriented material B, and a low enough glass transition temperature $T_g$ to remain isotropic when oriented at conditions necessary to cause birefringence in material B. Preferably, the film is maintained at a temperature of at least about 20° C. above the glass transition temperature of the isotropic material during stretching.

For design flexibility, conventional absorbing agents such as dyes and pigments can be added to one or more layers of the film, or can be applied in one or more coatings such as an adhesive, ink, or hard coat, or incorporated in a separate film or substrate that is subsequently laminated to the subject multilayer optical films, to add a baseline color or tint to the film or article for visual effect. This baseline color would of course be effective at essentially all viewing angles. Additional layers and coatings can also be added to modify optical, mechanical, or chemical properties of the film. See U.S. Pat. No. 6,368,699 (Gilbert et al.), "Multilayer Polymer Film With Additional Coatings or Layers". Conventional multilayer films and polarizers other than p-polarizing films can also be laminated to or otherwise used with the films described herein. Such conventional films may have reflection bands in the visible and/or near infrared regions of the spectrum for aesthetic and/or utilitarian purposes.

Figure 5:
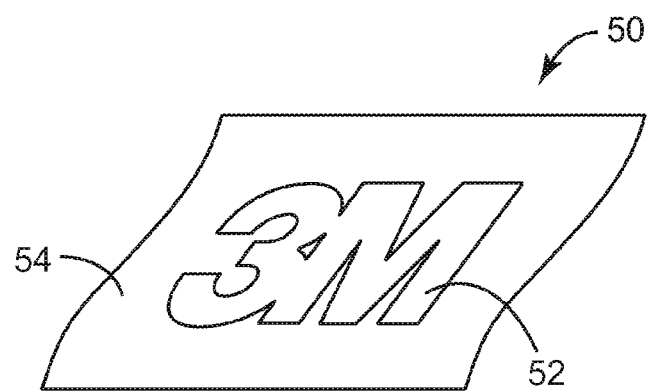
FIG. 5 is a perspective view of a film as described herein that has been embossed or otherwise thinned in a portion thereof.

The unique appearance characteristics of the subject films can be further modified by selectively thinning portions of the film to define a feature, pattern, or indicia. Such selective thinning preferably involves more than simply thinning a skin layer or coating, but rather thinning all the optical layers through the thickness of the film at the localized positions so that the perceived color at oblique angles is changed at those positions. This can be done by localized heating, embossing, or exposure to suitable laser radiation. Preferably the thinning is done after the desired refractive index relationships are established through the orientation process. In that way both the thinned portions and the remaining portions exhibit the desirable refractive index and wavelength properties described above. An example is shown in FIG. 5. There, portion 52 has been thinned in the form of a corporate logo on an optical film 50 that also includes unthinned portion or background 54. In both portions, the in-plane refractive indices of adjacent optical layers are substantially matched, and the out-of-plane refractive indices of such layers are substantially mismatched. When viewed normally along the z-axis, no pattern is discernable since both portions substantially transmit normally incident light. The film 50 can be completely clear, or of a uniform color if absorbing agents are present. At an oblique angle, however, the unthinned portion 54 changes to a first transmitted color and thinned portion 52 changes to a second transmitted color that is blue-shifted relative to the color of portion 54, the amount of blue-shift being proportional to the degree of thinning of the optical layers. Hence, the pattern is difficult to detect at normal viewing but becomes clearly visible at oblique angles. The pattern can incorporate more than two portions, each having a distinct thickness and hence a distinct color at oblique angles, and can also incorporate a gradual thickness change from one portion of the film to the other rather than step changes.

Alternatively, indicia can be added to the films by localized surface roughening or texturing. Such roughening scatters both s- and p-polarized light, and roughened regions stand out from the surrounding optical film. Localized surface texturing can be achieved by a variety of known techniques, such as laser marking, sandblasting, embossing with a matte finish roll, rubbing, and impinging jets.

Films as described herein and articles incorporating such films can be used in a variety of end-use applications. For example, specialized optical systems can benefit from the unique properties of a p-polarizer. See, for example, commonly assigned U.S. Pat. No. 6,952,312 (Weber et al.). Another end-use application is the area of authentication systems. The subject films can be permanently affixed to a document, such as a passport, so that an observer can read the document through the film, but can also tell whether the document is authentic by observing the unique color shift at oblique angles, optionally with an analyzing polarizer or with polarized light. The document or other substrate over which the film is applied can include indicia that are colored in such a way that the transmitted color of the film at an oblique angle matches the color of the indicia making them difficult to read, while they are easily read at normal incidence. The films can be sold in the form of a tape or label, which can be adhesively secured to a document or to a package for consumer goods, again for purposes of authentication. An adhesive—preferably a pressure sensitive adhesive but alternatively a hot-melt or curable adhesive—can be applied to one major surface of the film so that it can be applied to an object. The films can also be sold in the form of a security thread to be incorporated into a security document.

Conventional printed images and/or holographic images can be provided on either major surface of the films, by any suitable technique. Other conventional security features that can be incorporated into the subject films, or any suitable construction of which the film is a part, include microperforations that effectively prevent tampering, heat shrink characteristics that prevent tempering by the application of heat, patterned differential adhesion layers that effectively prevent tempering by delamination, and internal delamination characteristics that provide an indication of tampering. The subject films can also be incorporated into any suitable label, laminate, or card (such as an identification card or transparent or translucent financial transaction card), whether on the surface or in an interior layer of such item.

EXAMPLE

An example film will now be described. The polymer used in the isotropic layers of the film construction was specially formulated to achieve the necessary rheological, chemical, thermal, and optical properties. The polymers used in the film were chosen and/or developed according to the following conditions: they should be coextrudable; they should have adequate interlayer adhesion; and the isotropic polymer should have an unusually high refractive index in order to match the in-plane refractive indices of the birefringent polymer after stretching, and a low enough glass transition temperature so that it remains isotropic when oriented under conditions necessary to cause birefringence in the other polymer material. Preferably, the film is maintained at a temperature of at least about 20° C. above the glass transition temperature of the isotropic material during stretching.

Polymer 1—Co-PEN-HNLT

A copolyester was synthesized in a batch reactor with the following raw material charge: 127.3 kg dimethyl naphthalene dicarboxylate, 4.2 kg dimethyl isophthalate, 38.4 kg hexane diol, 50.5 kg ethylene glycol, 8.6 kg 1,3 butyl ethyl propanediol, 1.3 kg trimethylol propane, 34 g zinc acetate, 25 g cobalt acetate, and 75 g antimony triacetate. Under pressure of 0.20 MPa, this mixture was heated to 254° C. while removing methanol. After 34.5 kg of methanol was removed, 56 g of triethyl phosphonoacetate was charged to the reactor and then the pressure was gradually reduced to 133 Pa while heating to 285° C.

The condensation reaction by-product, ethylene glycol, was continuously removed until a polymer with an intrinsic viscosity of 0.84 dL/g, as measured in 60/40 wt. % phenol/o-dichlorobenzene at 86° C., was produced. This material, a thermoplastic polymer, had a glass transition temperature $T_g$ of 76° C. as measured by DSC using ASTM D3418 with a scan rate of 20° C./min, and at a relative humidity of about 50%. The thermal history of the polymer was removed as a factor by performing two DSC heat scans on the sample and recording the $T_g$ of the second heat scan.

Polymer 2—PET

The polyethylene terephthalate used in the example is synthesized in a batch reactor with the following raw material charge: 5,000 kg dimethyl terephthalate, 3,502 kg ethylene glycol, 1.2 kg manganese acetate, and 1.6 kg antimony triacetate. Under pressure of 1520 torr, this mixture is heated to 254° C. while removing the transesterification reaction by-product methanol. After 1,649 kg of methanol is removed, 2.45 kg of triethyl phosphonoacetate is charged to the reactor and then the pressure is gradually reduced to 1 torr while heating to 280° C.

The condensation reaction by-product, ethylene glycol, is continuously removed until a polymer with an intrinsic viscosity of 0.60 dL/g, as measured in 60/40 wt. % phenol/o-dichlorobenzene at 86° C., is produced. This material, a thermoplastic polymer, has a glass transition temperature $T_g$ of 79° C. and a melting temperature $T_m$ of 255° C. as measured by DSC using ASTM D3418 with a scan rate of 20° C./min, and at a relative humidity of about 50%. The thermal history of the polymer is removed as a factor by performing two DSC heat scans on the sample and recording the $T_g$ of the second heat scan.

Polymer 3—PETG

This copolyester was obtained commercially from Eastman Chemical Company, Kingsport, Tenn., under product code Eastar brand PETG 6763. It exhibits a glass transition temperature $T_g$ of 83° C.

Polymer 4—70/30 Polyester Blend

This is a blend of 70 wt % PET and 30 wt % PETG. It exhibits a glass transition temperature $T_g$ of about 81° C.

Film Example

A multilayer optical polarizing film was made using Polymer 1 as one of the light transmissible materials, and Polymer 4 (the blend of 70 wt % PET and 30 wt % PETG) for the other material. These materials were coextruded through a multilayer melt manifold to create a stack of 275 alternating layers of Polymer 1 and Polymer 4. An additional set of thick external protective skin layers made from Polymer 4 were coextruded on either side of the 275 layer stack to form a cast web with 277 total layers and a total thickness of 0.021 inches (0.53 mm). In this cast web, all layers were isotropic in refractive index, with Polymer 1 having an index of about 1.618 and Polymer 4 having an index of about 1.567 at visible wavelengths. A piece of this cast web was then heated by impingement with hot air at 100° C. for 45 seconds and then oriented simultaneously in two orthogonal in-plane directions at a draw rate of 100%/sec to a final draw ratio of 3.6×3.6. The resulting optical film had a thickness of about 0.0016 inches (0.041 mm) and a useable area of about 10 by 10 inches (about 650 cm$^2$). The refractive indices of the outer skin layers composed of Polymer 4 were measured with a Metricon prism coupler refractometer at 632.8 nm on the finished film and found to be:

Polymer 4: $n_x=n_y=1.635$; $n_z=1.51$

The refractive index of the other polymer was measured previously in a crushed pellet form with the same refractometer and found to be 1.618. By analyzing the optical properties of the finished (stretched) film, and knowing the final refractive indices of Polymer 4, it was determined that this other polymer had remained substantially isotropic, i.e., that it had the following refractive indices in the finished film:

Polymer 1: $n_x=n_y=n_z=1.618$

Figure 6:
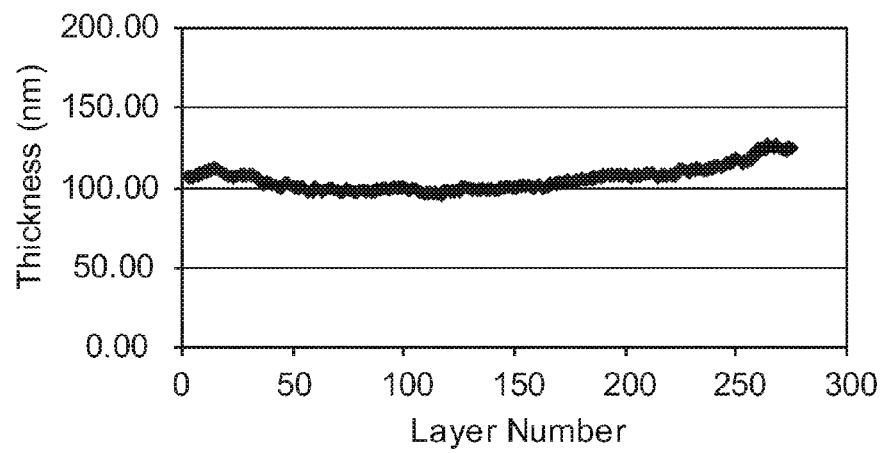
FIG. 6 is a plot of physical thickness of all 275 optical layers in an example film described below.

Hence, for this film, $\Delta n_x = \Delta n_y \approx 0.017$ $\Delta n_z \approx 0.108$ The relative thickness profile of the optical repeat units in the finished film was measured with an atomic force microscope (AFM). These relative measurements were then combined with a global scaling factor and an f-ratio factor selected for best agreement with the observed optical properties of the film, and the resulting physical thickness profile of the 275 optical layers in the film is shown in FIG. 6. Note that adjacent layers have approximately the same physical thickness, and hence in this case also approximately the same on-axis optical thickness (f-ratio≈0.50). Also, multiple distinct nonzero layer thickness gradients can be detected over various segments of the film thickness. The individual optical layers range in physical thickness from just under about 100 nm to about 125 nm. With the refractive index properties of the two materials as noted above, these thicknesses yield optical repeat units whose optical thicknesses range from just under 325 nm to about 405 nm. Doubling these values correspond to optical wavelengths of just under 650 nm to about 810 nm.

Figure 7A:
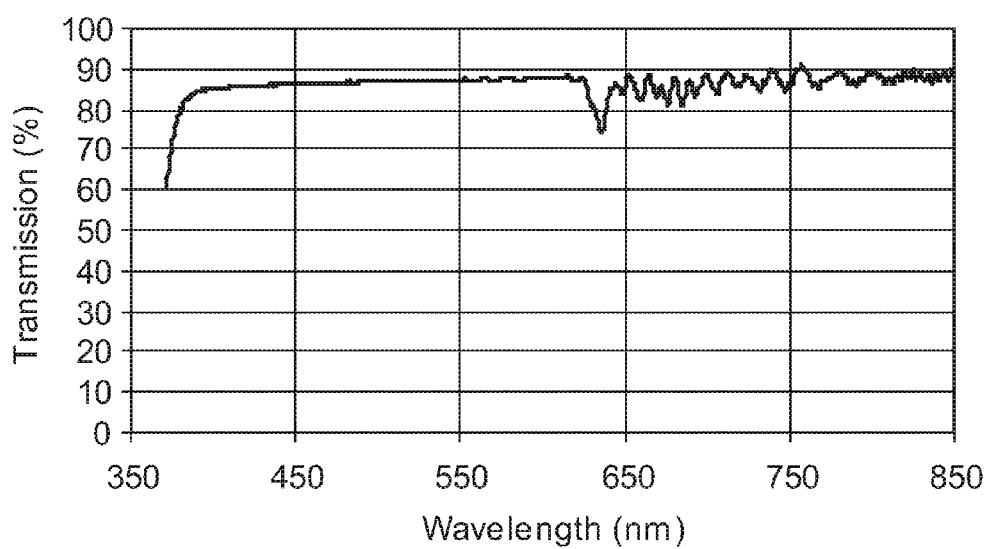
FIGS. 7a and 7b show the measured transmission of an example film in air at normal incidence and 60°, respectively.
Figure 7B:
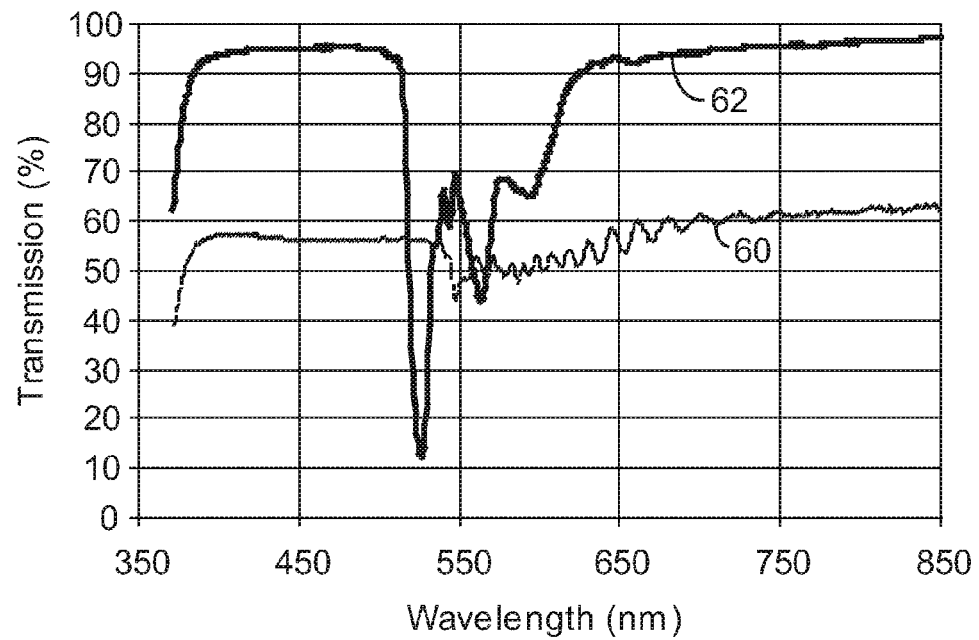

Despite the fact that some of the optical repeat units had optical thicknesses corresponding to half of a visible wavelength of light, the film was substantially clear when viewed at a normal angle (observation angle θ=0). When viewed at an observation angle of 60°, the film had a magenta transmitted appearance. This color was insensitive to rotations of the film about an axis normal to the film. Further, the color could be made to be more saturated or could be made to substantially disappear using an analyzer in front of the observer's eye, the analyzer being rotated to transmit p-polarized light and s-polarized light respectively. Also, the film did not become cyan at any point between θ=0 and 60°. The percent transmission of the film in air was measured and is shown in FIGS. 7a and 7b for normally incident light and light incident at 60°, respectively. In FIG. 7b, curve 60 is the transmission of s-polarized light only, and curve 62 is for p-polarized light only. The FIG. 7a-b graphs include no corrections or offsets for the broadband surface reflections at the front and rear film-air interfaces. Note the absence of any substantial reflection bands at normal incidence. Note also the presence of a significant reflection band for p-polarized light in the visible region at 60° incidence. The approximately 50% broadband reflectivity of s-polarized light in FIG. 7b is due to the film-air surface reflections.

Additional Polymers and Film Embodiments

Additional polymers have been developed and/or identified that satisfy the conditions mentioned above: that they should be coextrudable; that they should have adequate interlayer adhesion; and that the isotropic polymer should have an unusually high refractive index in order to match the in-plane refractive indices of the birefringent polymer after stretching, and a low enough glass transition temperature so that it remains isotropic when oriented under conditions necessary to cause birefringence in the other polymer material. Further, the polymer used as the isotropic layer desirably has a refractive index of at least about 1.61, more desirably about at least 1.65, so that polymers that exhibit greater birefringence (e.g., pure PET) can be used to help increase the z-index differential between optical layers to achieve higher reflectivity.

Polymer 5—Co-PEN-5545HD

A copolyester was synthesized in a batch reactor with the following raw material charge: 87.6 kg dimethyl naphthalene dicarboxylate, 57 kg dimethyl terephthalate, 12.3 kg hexane diol, 81.6 kg ethylene glycol, 0.7 kg trimethylol propane, 34 g zinc acetate, 25 g cobalt acetate, and 55 g antimony triacetate. Under pressure of 0.20 MPa, this mixture was heated to 254° C. while removing methanol. After 41.5 kg of methanol was removed, 56 g of triethyl phosphonoacetate was charged to the reactor and then the pressure was gradually reduced to 133 Pa while heating to 285° C.

The condensation reaction by-product, ethylene glycol, was continuously removed until a polymer with an intrinsic viscosity of 0.53 dL/g, as measured in 60/40 wt. % phenol/o-dichlorobenzene at 86° C., was produced. This material, a thermoplastic polymer, had a glass transition temperature $T_g$ of 92° C. as measured by DSC using ASTM D3418 with a scan rate of 20° C./min, and at a relative humidity of about 50%. The thermal history of the polymer was removed as a factor by performing two DSC heat scans on the sample and recording the $T_g$ of the second heat scan.

The polymer is suitable for use in the isotropic optical layers of a multilayer film, and has a refractive index of 1.612.

Polymer 6—Co-PEN Containing Nano-titania

The isotropic refractive index of coPEN-HNLT described as Polymer 1 can be increased to 1.65 by incorporation of about 30 wt % titania particles with average particle size of less than about 30 nm. Titania itself has a refractive index of about 2.4 in the visible. The nano-titania particles should be adequately dispersed to avoid excessive haze or scattering of light in the polymer matrix.

The resulting thermoplastic polymer-based material has the same glass transition temperature as Polymer 1, i.e., about 76° C., and is suitable for use in the isotropic optical layers of a multilayer film.

Polymer 7—Co-PEN Containing Nano-zirconia

The isotropic refractive index of coPEN-HNLT described as Polymer 1 can be increased to 1.65 by incorporation of about 40 wt % zirconia particles with average particle size of less than about 30 nm. Zirconia itself has a refractive index of about 2.2 in the visible. The nano-zirconia particles should be adequately dispersed to avoid excessive haze or scattering of light in the polymer matrix.

The resulting thermoplastic polymer-based material has the same glass transition temperature as Polymer 1, i.e., about 76° C., and is suitable for use in the isotropic optical layers of a multilayer film.

Polymer 8—High Index Acrylate Containing Nano-titania

Copolymers of naphthyl thio-acrylate and naphtyl thioethyl acrylate and/or naphthyl oxyethyl acrylate can be synthesized with 30 wt % titania particles to produce a polymer-based material having an isotropic refractive index of approximately 1.65. The titania particles, which should have an average size of less than about 30 nm, should be adequately dispersed to avoid excessive haze or scattering of light in the acrylate polymer matrix.

The glass transition temperature of this polymer-based material can be tailored by adjusting the relative proportions of the acrylate monomers, since $T_g \approx 100°$ C. for naphthyl thio-acrylate, $T_g \approx 40°$ C. for naphtyl thioethyl acrylate, and $T_g \approx 9°$ C. for naphthyl oxyethyl acrylate. In particular, the glass transition temperature of the material can be tailored to be below 79° C., the glass transition temperature of PET. This Polymer 8 is suitable for use in the isotropic optical layers of a multilayer film.

Polymer 9—High Index Acrylate Containing Nano-zirconia

Copolymers of naphthyl thio-acrylate and naphtyl thioethyl acrylate and/or naphthyl oxyethyl acrylate can be synthesized with 40 wt % zirconia particles to produce a polymer-based material having an isotropic refractive index of approximately 1.65. The zirconia particles, which should have an average size of less than about 30 nm, should be adequately dispersed to avoid excessive haze or scattering of light in the acrylate polymer matrix.

The glass transition temperature of this thermoplastic polymer-based material can be tailored by adjusting the relative proportions of the acrylate monomers, as described above in connection with Polymer 8, and can be tailored to be below 79° C. This Polymer 9 is suitable for use in the isotropic optical layers of a multilayer film.

Polymer 10—High Index Isotropic Co-PEN

A copolyester can be synthesized in a batch reactor with the following raw material charge: 127.3 kg 2,6-dimethyl naphthalene dicarboxylate, 8.4 kg 2,3-dimethyl naphthalene dicarboxylate, 48.4 kg hexane diol, 50.5 kg ethylene glycol, 8.6 kg 1,3 butyl ethyl propanediol, 1.3 kg trimethylol propane, 34 g zinc acetate, 25 g cobalt acetate, and 75 g antimony triacetate. Under pressure of 0.20 MPa, this mixture can then be heated to 254° C. while removing methanol. After 32.5 kg of methanol is removed, 56 g of triethyl phosphonoacetate can be charged to the reactor and then the pressure gradually reduced to 133 Pa while heating to 285° C.

The condensation reaction by-product, ethylene glycol, can be continuously removed until a polymer with an intrinsic viscosity of at least 0.6 dL/g, as measured in 60/40 wt. % phenol/o-dichlorobenzene at 86° C., is produced. This material, a thermoplastic polymer, has a glass transition temperature $T_g$ of approximately 76° C. as measured by DSC using ASTM D3418 with a scan rate of 20° C./min, and at a relative humidity of about 50%.

The thermoplastic polymer is suitable for use in the isotropic optical layers of a multilayer film, and has a refractive index of 1.63.

Polymer 11—Co-PHT

A copolyester was synthesized in a batch reactor with the following raw material charge: 100 kg dimethyl terephthalate, 93 kg 1,6-hexane diol, 3.1 kg triethylene glycol, 0.9 kg trimethylol propane, 50 g tetra butly titanate, 30 g cobalt acetate, and 35 g antimony triacetate. Under pressure of 0.20 MPa, this mixture was heated to 254° C. while removing methanol. After 33 kg of methanol was removed, 35 g of triethyl phosphonoacetate was charged to the reactor and then the pressure was gradually reduced to 133 Pa while heating to 270° C.

The condensation reaction by-product, 1,6 hexane diol, was continuously removed until a polymer with an intrinsic viscosity of 0.86 dL/g, as measured in 60/40 wt. % phenol/o-dichlorobenzene at 86° C., was produced. This material, a thermoplastic polymer, had a glass transition temperature $T_g$ of 15° C. and a melting temperature $T_m$ of 142° C. as measured by DSC using ASTM D3418 with a scan rate of 20° C./min, and at a relative humidity of about 50%. The thermal history of the polymer was removed as a factor by performing two DSC heat scans on the sample and recording the $T_g$ of the second heat scan.

The polymer is suitable for use in the birefringent optical layers of a multilayer film, and has a pre-stretch refractive index of about 1.55. Under suitable biaxial stretching conditions, the in-plane refractive indices can increase to about 1.59 to 1.61 and the out-of-plane refractive index can diminish to about 1.51.

Polymer 12—80/20 Polyester Blend

This is a blend of 80 wt % PET and 20 wt % PETG. It has a glass transition temperature $T_g$ of about 82° C.

The polymer is suitable for use in the birefringent optical layers of a multilayer film, and has a pre-stretch refractive index of about 1.568. Under suitable biaxial stretching conditions, the in-plane refractive indices can increase to about 1.638 and the out-of-plane refractive index can diminish to about 1.506.

Polymer 13—CoPVN Isotropic Copolymer

Copolymers of vinyl naphthalene and phenoxy ethyl acrylate or other low $T_g$ acrylates such as ethyl acrylate, butyl acrylate, and iso-octyl acrylate can be synthesized to provide a refractive index of 1.65 and a glass transition temperature of less than 79° C. Optionally, butadiene or other low $T_g$ rubber comonomers can be copolymerized with vinyl naphthalate to provide a refractive index of 1.65 and a glass transition temperature of less than 79° C.

Polymer 14—Atactic PVN

Atactic polyvinyl naphthalene has an isotropic refractive index of 1.68 and thus can be useful for increasing the index difference along the z-axis for increased reflectivity. The $T_g$ of this material is 151° C., and hence it would be suitable for coextrusion and orientation with a higher $T_g$ CoPEN as the birefringent material designed to have in-plane refractive indices of 1.68-1.70 after orientation.

Polymer 15—High $T_g$ CoPEN Birefringent Polymer

Copolymers of PEN (polyethylene naphthalate) can be synthesized utilizing 2,6 dimethyl naphthalate and 2,3 dimethyl naphthalate or 4,4 biphenyl dicarboxylate as comonomers to dilute the in-plane refractive indices of PEN down to 1.68-1.7 so as to match those of atactic PVN as the istotropic material.

Further Film Embodiments

A multilayer optical polarizing film can be made using Polymer 5 as the isotropic light transmissible material, and Polymer 11 (the co-PHT) as the birefringent light transmissible material. These materials can be coextruded through a multi-layer melt manifold to create a stack of 275 (or other suitable number of) alternating layers of Polymer 5 and Polymer 11. An additional set of thick external protective skin layers made from Polymer 11 can be coextruded on either side of the 275 layer stack to form a cast web with 277 total layers and a total thickness of, say, about 0.019 inches (0.48 mm) or other suitable value. In this cast web, all layers are isotropic in refractive index, with Polymer 5 having an index of about 1.612 and Polymer 11 having an index of about 1.55 at visible wavelengths. This cast web can then be heated to a suitable temperature, such as 115° C., by impingement with hot air or other conventional heating means and oriented simultaneously in two orthogonal in-plane directions at a suitable draw rate, such as 1000%/sec, to a final draw ratio such as 3.0×3.0. The resulting optical film can have a thickness of about 0.002 inches (0.05 mm). The skin and optical layers composed of Polymer 11 can achieve the following refractive indices in the finished film:

Polymer 11: $n_x=n_y=1.61$; $n_z=1.51$

The refractive index of the other polymer can remain isotropic by appropriate selection of the stretch conditions, with an isotropic refractive index of 1.612:

Polymer 5: $n_x=n_y=n_z=1.612$

Hence, for such a film, $$\Delta n_x = \Delta n_y \approx 0.002$$

$$\Delta n_z \approx 0.102$$

The thickness profile of the optical layers in the finished film can be any suitable function that achieves the desired transmitted color at an oblique angle, whether uniform, step, linear, or other known function.

Note that the in-plane refractive index difference is well below 0.01, yielding a film that is substantially clear when viewed at 0° observation angle even if each and every optical repeat unit in the film has an optical thickness of half of a visible wavelength.

In another embodiment, a multilayer optical polarizing film can be made using Polymer 1 as the isotropic light transmissible material, and Polymer 12 (the blend of 80 wt % PET and 20 wt % PETG) as the birefringent material. These materials can be coextruded through a multi-layer melt manifold to create a stack of 223 (or other suitable number of) alternating layers of Polymer 1 and Polymer 12. The stack need not have any layer thickness gradient, but preferably does have a gradient corresponding to a full-width at half-maximum (FWHM) bandwidth of the reflection band in the finished film of about 100 nm. This stack can be provided to an asymmetric multiplier where the extrudate is split into unequal widths of a suitable ratio, such as about 1:1.44, and stacked after equalizing the widths to provide two optical packets and a total of 445 optical layers. An additional set of thick external protective skin layers made from Polymer 12 can be coextruded on either side of the 445 layers to form a cast web with 447 total layers and a total thickness of 0.020 inches (0.51 mm). In this cast web, all layers are isotropic in refractive index, with Polymer 1 having an index of about 1.618 and Polymer 12 having an index of about 1.568 at visible wavelengths. This cast web can then be heated by impingement with hot air at 102° C. and then oriented in two orthogonal in-plane directions at a suitable draw rate to a final draw ratio of about 3.5×3.5. The skin and optical layers composed of Polymer 12 can achieve the following refractive indices in the finished film:

Polymer 12: $n_x=n_y=1.638$; $n_z=1.506$

The refractive index of the other polymer can remain isotropic by appropriate selection of the stretch conditions, with an isotropic refractive index of 1.618:

Polymer 1: $n_x=n_y=n_z=1.618$

Figure 8:
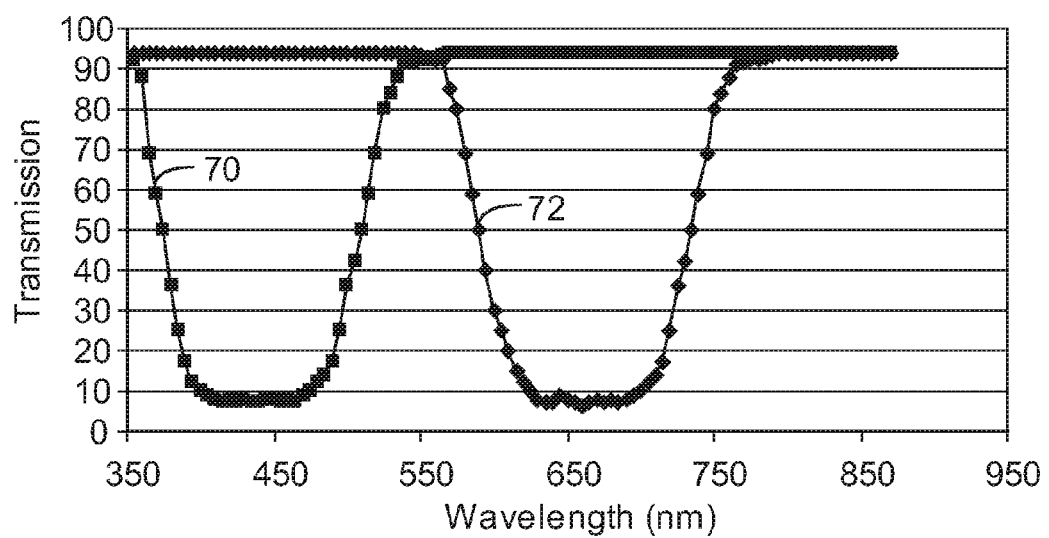
FIG. 8 shows a calculated transmission spectrum for p-polarized light at about 60° incidence of two optical layer packets that can be used in a single optical film to yield a green transmitted color at such angle.

Hence, for such a film, $\Delta n_x = \Delta n_y \approx 0.02$ $\Delta n_z \approx 0.112$ The resulting optical film can provide, for obliquely-incident light, two distinct p-polarization reflection bands corresponding to the two 223 layer packets in the film. With suitable control of the layer thickness profile of each packet and of the width ratio for the asymmetric multiplier, the reflection bands can be separated sufficiently to define a gap therebetween characterized by low reflectivity and high transmission. In this way a film that shifts in transmitted appearance from clear at normal incidence to green at about 60° can be provided. Computed transmission spectra at 60° incidence and for p-polarized light only are shown in FIG. 8, where the curves 70, 72 are the computed transmission of the two individual packets that make up the film. As demonstrated, each packet produces a strong reflection band at the oblique angle. The mathematical product of these two curves yields the computed transmission of the film when illuminated with p-polarized light at 60°. Of course, a clear-to-green multilayer film as just described can also be made with other polymer combinations taught herein, so long as the optical layer distribution is tailored to provide the separated reflection bands at 60°.

Figure 9:
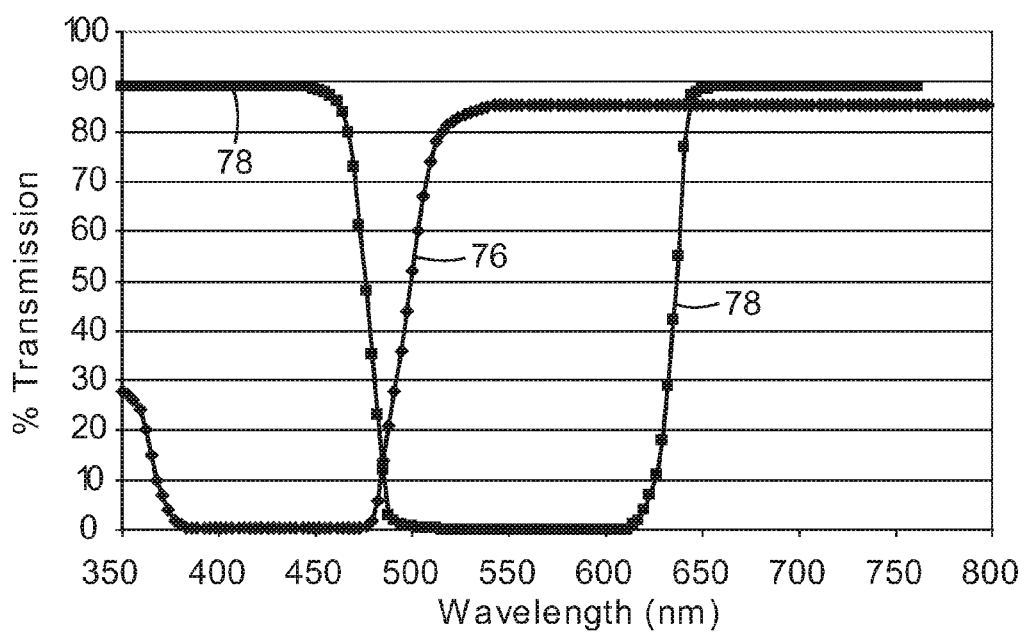
FIG. 9 shows a calculated transmission spectrum for p-polarized light at about 60° incidence of a dyed optical film.

In yet another embodiment, a multilayer optical interference film can be made in the same way as the Example Film, except the layer thickness can be controlled to provide a substantially linear layer thickness gradient across the thickness of the film between limits that provide a single reflection band extending from about 500 nm to about 600 nm for p-polarized light at 60°. Also, a yellow dye (absorbing from about 400 to 500 nm) is incorporated into the film (or in a separate film or coating laminated or otherwise applied to the multilayer film) in an amount sufficient to provide a yellow baseline color to the film at normal viewing. FIG. 9 exemplifies the absorption of the yellow dye with curve 76, which curve is relatively insensitive to changes in viewing or incidence angle θ. On the other hand, curve 78 exemplifies the transmission of the optical layer stack for p-polarized light at θ=60°. Curve 78, of course, changes greatly with viewing angle, becoming a flat line at the upper end of the percent transmission scale for normally incident light. Such a combination of absorbing dye and color shifting p-polarizing film produces a film that changes from yellow at θ=0° to red at θ=60°.

Many variations of the foregoing yellow-to-red film are contemplated, by changing the absorbing agent and/or the optical stack design (and thus the reflection band position, width, number, and/or strength). In one such variation, the yellow dye is replaced with a blue dye that absorbs from about 600 to 700 nm. Also, the 500-600 nm reflection band is replaced with band that extends from about 400 to 500 nm for p-polarized light at 60° by an appropriate change in optical layer thickness. The result is a film that changes from blue at θ=0° to green at θ=60°.

Other material pairs of interest for the p-polarizing multilayer optical film are combinations in which the birefringent light transmissible material is Polymer 2 (PET), and the isotropic light transmissible material is selected from the group of Polymer 6 (co-PEN with nano-titania), Polymer 7 (co-PEN with nano-zirconia), Polymer 8 (acrylate with nano-titania), and Polymer 9 (acrylate with nano-zirconia). These material combinations can be coextruded and oriented under suitable conditions analogous to those of the Example to provide a finished multilayer p-polarizing film whose layers have the following refractive indices:

Isotropic material: $n_x \approx n_y \approx n_z \approx 1.65$
Birefringent material (Polymer 2): $n_x \approx n_y \approx 1.65$; $n_z \approx 1.49$ And thus, $\Delta n_x = \Delta n_y \approx 0$ $\Delta n_z \approx 0.16$ The relatively large z-index difference—greater than 0.15—provides substantially higher reflectivity for off-axis p-polarized light. At the same time, a good in-plane index match ensures substantially no reflection bands at normal incidence.

Another material pair of interest for the p-polarizing multilayer optical film is a combination in which the birefringent light transmissible material is Polymer 12 (80% PET/20% PETG) and the isotropic light transmissible material is Polymer 10 (High Index co-PEN). These materials can be coextruded and oriented under suitable conditions analogous to those of the Example to provide a finished multilayer p-polarizing film whose layers have the following refractive indices:

Polymer 10: $n_x \approx n_y \approx n_z \approx 1.63$
Polymer 12: $n_x n_y \approx 1.64$; $n_z \approx 1.50$ And thus, $\Delta n_x = \Delta n_y \approx 0.01$ $\Delta n_z \approx 0.13$ In other embodiments, sPS (syndiotactic polystyrene) or sPN (syndiotactic polynaphthalene) can be utilized as the birefringent materials. Since these polymers are characterized in that refractive indices along the stretch directions (x- and y-axes) decrease and the refractive index along the z-axis increases upon orientation, the isotropic polymer should be chosen such that its refractive indices are lower than that of either sPS or sPN. For example, the refractive indices of sPS are 1.585 before orientation and after stretching the in-plane refractive indices derease to 1.56 and the z-axis refractive index increases to 1.65. Since the $T_g$ of sPS is approximately 105° C., a copolymer such as PETG can be used as the isotropic polymer to give the following sets of refractive indices after orientation:

PETG: $n_x \approx n_y \approx n_z \approx 1.56$
sPS: $n_x \approx n_y \approx 1.56$; $n_z \approx 1.65$ $\Delta n_x \approx \Delta n_y \approx 0.0$ $\Delta n_z \approx 0.09$ Glossary of Certain Terms F-ratio: the relative contribution of a given individual layer to the total optical thickness of a given ORU. The f-ratio for the k-th individual layer is:

$$f_k = \frac{n_k \cdot d_k}{\sum_{m=1}^{N} n_m \cdot d_m},$$

where $1 \leq k \leq N$, where N is the number of constituent layers in the ORU, where $n_k$ ($n_m$) is the relevant refractive index of k-th (m-th) layer, and $d_k$ ($d_m$) is the physical thickness of layer k (m).

Optical Repeat Unit ("ORU"): a stack of at least two individual layers which repeats across the thickness of a multilayer optical film, though corresponding repeating layers need not have the same thickness.

Optical thickness: the physical thickness of a given body times its refractive index. In general, this is a function of wavelength and polarization.

Reflection band: a spectral region of relatively high reflectance bounded on either side by regions of relatively low reflectance.

All patents and patent applications referenced herein are incorporated by reference in their entirety. Various modifications and alterations of this invention will be apparent to those skilled in the art without departing from the scope and spirit of this invention, and it should be understood that this invention is not limited to the illustrative embodiments set forth herein.

What is claimed is:

1. An optical film, comprising a plurality of layers that form a plurality of optical repeat units, at least some of the optical repeat units having optical thicknesses equal to half of a wavelength of visible light, and wherein the optical film has a clear appearance at normal incidence when illuminated with unpolarized light.

2. The film of claim 1, wherein the film has no reflection band of reflectivity greater than 20% for normally incident unpolarized light.

3. The film of claim 1, wherein the film comprises alternating layers of a first and second thermoplastic polymer, and wherein the second polymer is birefringent.

4. The film of claim 3, wherein the second polymer has a refractive index along a thickness axis of the film that differs from a refractive index of the first polymer along the thickness axis of the film by at least 0.1.

5. The film of claim 3, wherein the first polymer has a refractive index of at least 1.65.

6. The film of claim 3, wherein the film has a first and second portion, and the first portion is selectively thinned relative to the second portion to form indicia.

7. The film of claim 1, wherein the film has a clear transmitted appearance at normal incidence.

8. The film of claim 3, wherein the first polymer has a refractive index of at least 1.61 and a low enough glass transition temperature so that it remains isotropic when oriented under conditions necessary to cause birefringence in the second polymer.

9. The film of claim 8, wherein the first polymer comprises particles selected from the group of titania and zirconia.

10. An optical film whose transmitted appearance when illuminated with unpolarized light changes from clear at normal viewing to a first color over an angular range of observation angles, and where the optical film does not appear cyan over such angular range.

11. The film of claim 10, wherein the film has no reflection band of reflectivity greater than 20% for normally incident unpolarized light.

12. The film of claim 10, wherein the film comprises alternating layers of a first and second thermoplastic polymer, and wherein the second polymer is birefringent.

13. The film of claim 12, wherein the first polymer is isotropic.

14. The film of claim 10, wherein the first color is green.
15. The film of claim 10, wherein the first color is yellow.
16. The film of claim 10, wherein the first color is magenta.
17. The film of claim 10, wherein the first color is red.
18. The film of claim 10, wherein the first color is blue.

19. The film of claim 12, wherein the first polymer has a refractive index of at least 1.61 and a low enough glass transition temperature so that it remains isotropic when oriented under conditions necessary to cause birefringence in the second polymer.

20. The film of claim 19, wherein the first polymer comprises particles selected from the group of titania and zirconia.

* * * * *

UNITED STATES PATENT AND TRADEMARK OFFICE
CERTIFICATE OF CORRECTION

| | | |
|---|---|---|
| PATENT NO. | : 7,744,987 B2 | Page 1 of 1 |
| APPLICATION NO. | : 11/837627 | |
| DATED | : June 29, 2010 | |
| INVENTOR(S) | : Timothy J Hebrink | |

It is certified that error appears in the above-identified patent and that said Letters Patent is hereby corrected as shown below:

Title page Item 54
Title; Delete "OPTICAL POLARIZING FILMS" and insert -- OPTICAL POLARIZING FILMS WITH DESIGNED COLOR SHIFTS --, therefor.

Title Page Column 2 (Other Publications); Line 1, Delete "Muitilayer" and insert -- Multilayer --, therefor.

Column 5
Line 27, Delete "$\Delta n_{x \text{ and for } \Delta n_y}$" and insert -- $\Delta n_x$ and for $\Delta n_y$ --, therefor.

Column 10
Line 30, Delete "Polymer4:" and insert -- Polymer 4: --, therefor.

Column 16
Line 60, Delete "Polymer 12: $n_x n_y \approx 1.64$; $n_z \approx 1.50$" and insert
-- Polymer 12: $n_x \approx n_y \approx 1.64$; $n_z \approx 1.50$ --, therefor.

Signed and Sealed this
Twenty-first Day of February, 2012

David J. Kappos
*Director of the United States Patent and Trademark Office*

UNITED STATES PATENT AND TRADEMARK OFFICE
CERTIFICATE OF CORRECTION

PATENT NO. : 7,744,987 B2  Page 1 of 1
APPLICATION NO. : 11/837627
DATED : June 29, 2010
INVENTOR(S) : Timothy J Hebrink It is certified that error appears in the above-identified patent and that said Letters Patent is hereby corrected as shown below:

Title page Item 54, and at Column 1, line 1
Title; Delete "OPTICAL POLARIZING FILMS" and insert -- OPTICAL POLARIZING FILMS WITH DESIGNED COLOR SHIFTS --, therefor.

Title Page Column 2 (Other Publications); Line 1, Delete "Muitilayer" and insert -- Multilayer --, therefor.

Column 5
Line 27, Delete "$\Delta n_{x \text{ and for } \Delta ny}$" and insert -- $\Delta n_x$ and for $\Delta n_y$ --, therefor.

Column 10
Line 30, Delete "Polymer4:" and insert -- Polymer 4: --, therefor.

Column 16
Line 60, Delete "Polymer 12: $n_x n_y \approx 1.64$; $n_z \approx 1.50$" and insert -- Polymer 12: $n_x \approx n_y \approx 1.64$; $n_z \approx 1.50$ --, therefor.

This certificate supersedes the Certificate of Correction issued February 21, 2012.

Signed and Sealed this
Twentieth Day of March, 2012

David J. Kappos
*Director of the United States Patent and Trademark Office*